United States Patent
Tominaga et al.

(10) Patent No.: US 10,775,341 B2
(45) Date of Patent: Sep. 15, 2020

(54) SENSOR ELEMENT, MANUFACTURING METHOD THEREFOR, AND GAS SENSOR

(71) Applicant: NGK INSULATORS, LTD., Nagoya-shi, Aichi (JP)

(72) Inventors: Akari Tominaga, Nagoya (JP); Hirohito Kiyota, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 296 days.

(21) Appl. No.: 15/455,180

(22) Filed: Mar. 10, 2017

(65) Prior Publication Data

US 2017/0276636 A1   Sep. 28, 2017

(30) Foreign Application Priority Data

Mar. 25, 2016 (JP) .................... 2016-061366

(51) Int. Cl.
*G01N 27/407* (2006.01)
*G01N 27/406* (2006.01)
*G01N 27/41* (2006.01)

(52) U.S. Cl.
CPC ..... *G01N 27/4077* (2013.01); *G01N 27/4067* (2013.01); *G01N 27/4072* (2013.01); *G01N 27/41* (2013.01)

(58) Field of Classification Search
CPC ........... G01N 27/4077; G01N 27/4072; G01N 27/4067; G01N 27/41; G01N 27/406–41; G01N 33/0004–0075
See application file for complete search history.

(56) References Cited

U.S. PATENT DOCUMENTS

| | | | |
|---|---|---|---|
| 5,672,811 A | 9/1997 | Kato et al. | |
| 6,322,247 B1* | 11/2001 | Bonne | G01F 1/6842 374/138 |
| 6,355,152 B1* | 3/2002 | Kato | G01N 27/4072 204/425 |
| 6,361,206 B1* | 3/2002 | Bonne | G01F 1/6842 374/135 |
| 8,246,800 B2* | 8/2012 | Miyashita | G01N 27/4071 204/429 |

(Continued)

FOREIGN PATENT DOCUMENTS

| | | |
|---|---|---|
| JP | 2004-239916 A | 8/2004 |
| JP | 2011-102797 A | 5/2011 |

*Primary Examiner* — Maris R Kessel
*Assistant Examiner* — Joshua L Allen
(74) *Attorney, Agent, or Firm* — Global IP Counselors, LLP

(57) ABSTRACT

In a sensor element 101, oxygen contained in a gas to be measured introduced into a first internal space 20 through a first diffusion control part 11 is pumped out by applying voltage between an inner pump electrode 22 and an outer pump electrode 23. After the oxygen is pumped out, NOx in the gas to be measured generates oxygen by being reduced by a measurement electrode 44. This oxygen is pumped by applying voltage between the measurement electrode 44 and the outer pump electrode 23. On the basis of current generated according to the amount of oxygen thus pumped, the NOx gas concentration is calculated. A slit width of the first diffusion control part 11 on an entrance side is larger than a slit width on an exit side.

7 Claims, 6 Drawing Sheets

(56) References Cited

U.S. PATENT DOCUMENTS

| | | | | |
|---|---|---|---|---|
| 2003/0172741 A1* | 9/2003 | Busch | ............... | G01N 1/2252 |
| | | | | 73/861.21 |
| 2005/0211554 A1* | 9/2005 | Kurachi | ............ | G01N 27/4071 |
| | | | | 204/426 |
| 2007/0108049 A1* | 5/2007 | Wahl | ............... | G01N 27/4071 |
| | | | | 204/424 |
| 2008/0282773 A1* | 11/2008 | Varesi | ................ | G01N 7/10 |
| | | | | 73/31.05 |
| 2009/0242404 A1* | 10/2009 | Miyashita | ......... | G01N 27/4071 |
| | | | | 204/431 |
| 2011/0147214 A1* | 6/2011 | Fujita | ............... | G01N 27/4071 |
| | | | | 204/424 |
| 2011/0174049 A1* | 7/2011 | Shindo | ............. | G01N 27/4163 |
| | | | | 73/1.06 |
| 2011/0233060 A1* | 9/2011 | Horisaka | ........... | G01N 27/4072 |
| | | | | 204/412 |
| 2013/0255352 A1* | 10/2013 | Ohtsubo | ............. | G01R 31/28 |
| | | | | 73/1.06 |
| 2017/0261463 A1* | 9/2017 | Sugiura | ............ | G01N 27/4071 |

\* cited by examiner (SIDE OF GAS INLET)   (SIDE OF BUFFER SPACE)

SENSOR ELEMENT, MANUFACTURING METHOD THEREFOR, AND GAS SENSOR

BACKGROUND OF THE INVENTION

1. Field of the Invention

The present invention relates to a sensor element, a manufacturing method therefor, and a gas sensor.

2. Description of the Related Art

There has hitherto been known a gas sensor that detects the concentration of a specific gas component, such as NOx, in a gas to be measured, for example, exhaust gas of au automobile. For example, PTL 1 and PTL 2 each describe a gas sensor including a sensor element shaped like a long plate-shaped member and formed by stacking a plurality of airtight oxygen-ion conductive solid electrolyte layers.

FIG. 10 is a schematic cross-sectional view schematically illustrating an exemplary structure of a gas sensor 300 of such a conventional art. As illustrated, the gas sensor 300 includes a sensor element 307. This sensor element 307 is an element having a structure in which dense oxygen-ion conductive solid electrolyte layers 301 to 306 are stacked. In this sensor element 307, a gas-to-be-measured flowing part in which the gas to be measured is introduced is provided between a lower surface of the solid electrolyte layer 306 and an upper surface of the solid electrolyte layer 304, and the gas-to-be-measured flowing part includes a gas introduction portion 310 and first to third internal spaces 320, 340, and 361. A measurement electrode 344 is provided on a lower surface of the third internal space 361 (the upper surface of the solid electrolyte layer 304). Also, an outer pump electrode 323 is provided on an upper surface of the solid electrolyte layer 306. On the other hand, between an upper surface of the solid electrolyte layer 303 and a lower surface of the solid electrolyte layer 305, a reference-gas introduction space 343 is provided into which reference gas serving as the reference of detection of the concentration of a specific gas component in the gas to be measured is introduced. A reference electrode 342 is provided on the upper surface of the solid electrolyte layer 303 facing the reference-gas introduction space 343. The reference electrode 342 is covered with a reference-gas introduction layer 348 formed by a porous material, and the reference gas is introduced from the reference-gas introduction space 343 through the reference-gas introduction layer 348. In this gas sensor 300, when the gas to be measured is introduced into the third internal space 361 of the gas-to-be-measured flowing part, an electromotive force Va is generated between the measurement electrode 344 and the reference electrode 342. On the basis of the electromotive force Va, oxygen is pumped out or pumped in via the outer pump electrode 323 and the measurement electrode 344. The concentration of a specific gas component in the gas to be measured is detected on the basis of a current $Ip2$ flowing when the oxygen is pumped out or pumped in.

CITATION LIST

Patent Literature

PTL 1: JP 3798412 B
PTL 2: JP 2011-102797 A

SUMMARY OF THE INVENTION

In such a conventional gas sensor, solids, such as soot, contained in the gas to be measured sometimes adhere to an entrance of the slit-shaped gas introduction portion 310. The temperature near the entrance is about 400° C. to 600° C., and is not sufficient for combustion of the solids. If the solids adhere to the entrance of the gas introduction portion 310, the amount of gas to be measured introduced into the first internal space 320 is limited. Hence, the detected gas concentration does sometimes not coincide with the actual gas concentration.

The present invention has been made in view of the above-described problem, and a main object of the invention is to prevent a detected value of a gas concentration from becoming inaccurate owing to solids contained in a gas to be measured.

A sensor element according to the present invention includes:
- one or more slits provided on an entrance side of an internal space in a base formed of an oxygen-ion conductive solid electrolyte;
- inner and outer pump electrodes respectively disposed inside and outside the base and configured to pump out oxygen contained in a gas to be measured introduced into the internal space from the internal space to an external space;
- inner and outer measurement electrodes respectively disposed inside and outside the base and configured to decompose a predetermined gas component contained in the gas to be measured after the oxygen is pumped out by the inner and outer pump electrodes and to pump out oxygen generated by the decomposition to the external space; and
- a heater configured to heat the base,
wherein at least one of the one or more slits is a width transition slit having a slit width that is larger on an entrance side of the slit than on an exit side of the slit.

In this sensor element, oxygen contained in the gas to be measured introduced from the external space into the internal space through the slit is pumped out to the external space by applying voltage between the inner pump electrode and the outer pump electrode. This can make the concentration of oxygen contained in the gas to be measured close to zero. Next, a predetermined gas component contained in the gas to be measured after the oxygen is pumped out to the external space is decomposed, and oxygen generated by the decomposition is subjected to pumping by applying voltage between the inner and outer measurement electrodes. For example, the concentration of the predetermined gas component is calculated on the basis of the current or voltage generated in accordance with the amount of oxygen thus subjected to pumping. Here, the at least one slit is a width transition slit having the slit width that is larger an the entrance side of the slit than on the exit side of the slit. For this reason, most solids, such as soot, contained in the gas to be measured do not adhere near the entrance of the width transition slit having the large slit width, but enter the width transition slit and adhere to a portion having the small slit width. Since the temperature inside the width transition slit is heated to a higher temperature by the heater than near the entrance, the solids adhering inside the width transition slit burn and disappear. As a result, the amount of the introduced gas to be measured is not limited by the adhering solids. Therefore, the detected value of the gas concentration can be prevented from being made inaccurate by the solids contained in the gas to be measured.

In the sensor element of the present invention, the slit width of the width transition slit on the entrance side is larger in an entrance end portion than in an entrance center portion, and the slit width of at least the entrance end portion may be larger than the slit width of the width transition slit on the exit side. In this case, solids, such as soot, contained in the gas to be measured easily enter the width transition slit from the entrance end portion having the large slit width of the entrance of the width transition slit.

In the sensor element of the present invention, the one or more slits may be a plurality of (for example, two) slits.

In the sensor element of the present invention, the one or more slits may be two slits respectively provided on sides close to and far from the heater, and the slit close to the heater may be the width transition slit. In this case, since the width transition slit is provided on the side close to the heater, the inside of the width transition slit is easily heated to a high temperature by the heater. For this reason, solids adhering inside the width transition slit easily burn and disappear.

A manufacturing method for a sensor element according to the present invention manufactures the above-described sensor element, and includes:

(a) a step of preparing a plurality of green sheets each formed of an oxygen-ion conductive solid electrolyte;
(b) a step of forming precursors of the inner and outer pump electrodes and precursors of the inner and outer measurement electrodes on at least one green sheet of the plurality of green sheets and forming disappearing material layers on surfaces of two green sheets facing the internal space to define the internal space, of the plurality of green sheets, the disappearing material layers being formed of a material that burns and disappears during firing, and having a thickness increasing toward an entrance of the internal space; and
(c) a step of stacking the plurality of green sheets so that a slit forming portion formed of an oxygen-ion conductive solid electrolyte is held between the disappearing material layers and treating the plurality of green sheets at a predetermined firing temperature so that the green sheets and the slit forming portion are fired and the disappearing material layers disappear to form the width transition slit.

In this manufacturing method, the portion remaining after the disappearing material layers burn and disappear becomes the width transition slit. Since the disappearing material layers are formed so that their thickness increases toward the entrance of the internal space, the slit takes over the shape of the disappearing material layers, and the slit width of the slit is larger on the entrance side than an the exit side. Therefore, according to this manufacturing method, the above-described sensor element can be manufactured easily. Also, the portion of the slit forming portion on the entrance side of the internal space is apt to hang down during firing because it is less sufficiently supported than the portion on the depth side of the internal space. However, since the thickness of the disappearing material layers on the entrance side is large and the slit width on the entrance side is large after the disappearing material layers disappear, even if the slit forming portion hangs down, it can be prevented from closing the slit.

In the manufacturing method for the sensor element according to the present invention, in the step (b), when the disappearing material layers are formed, after a first disappearing material layer having a length longer than or equal to the length of the slit forming portion in the depth direction (gas flowing direction) may be formed from the entrance of the internal space, a second disappearing material layer having a length shorter than the length of the slit forming portion in the depth direction may be formed from the entrance of the internal space on the first disappearing material layer or the slit forming portion. These first and second disappearing material layers can be easily formed, for example, by printing.

A gas sensor according to the present invention includes the sensor element according to any of the above-described aspects. For this reason, this gas sensor can obtain the effects similar to those of the above-described sensor element of the present invention, for example, this gas sensor can prevent the detected value of the gas concentration from being made inaccurate owing to solids contained in the gas to be measured.

DETAILED DESCRIPTION OF THE INVENTION

Figure 1:
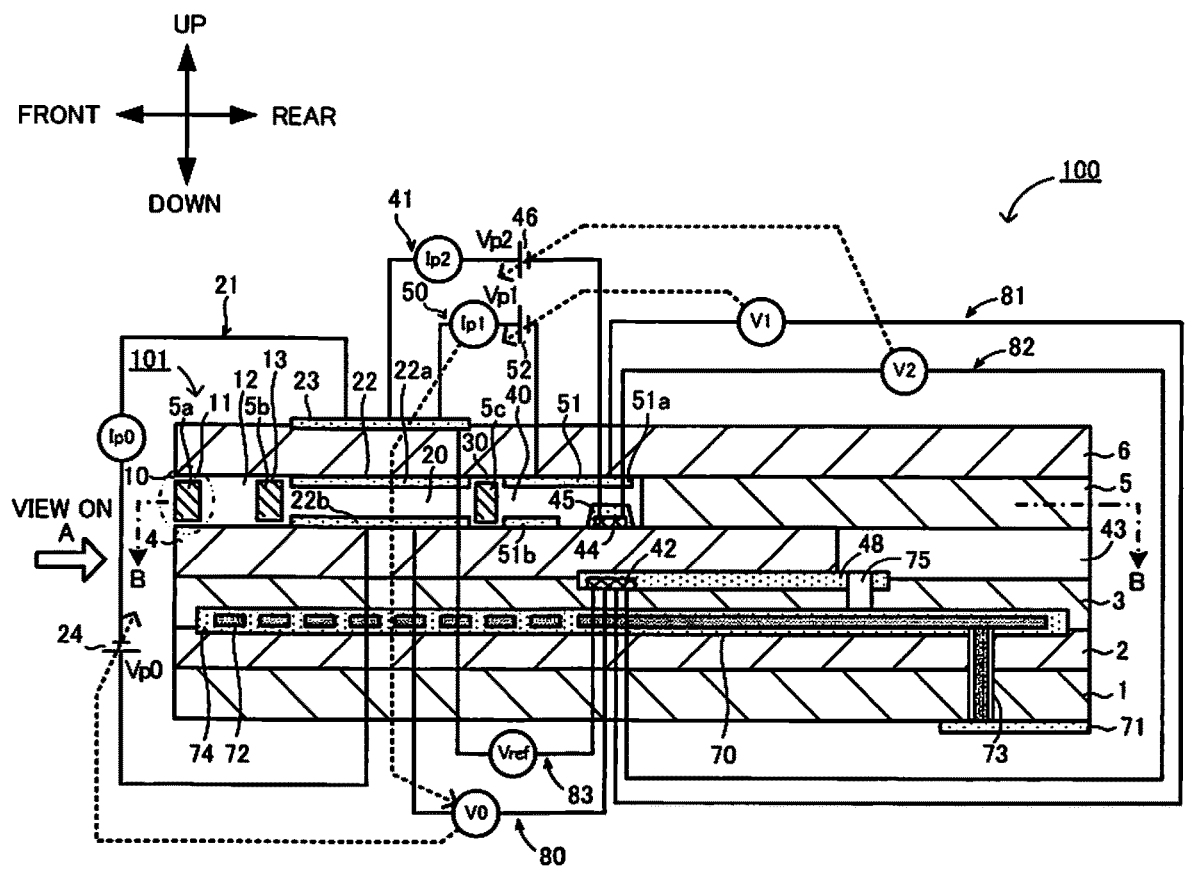
FIG. 1 is a schematic cross-sectional view schematically illustrating an exemplary structure of a gas sensor 100.
Figure 2:
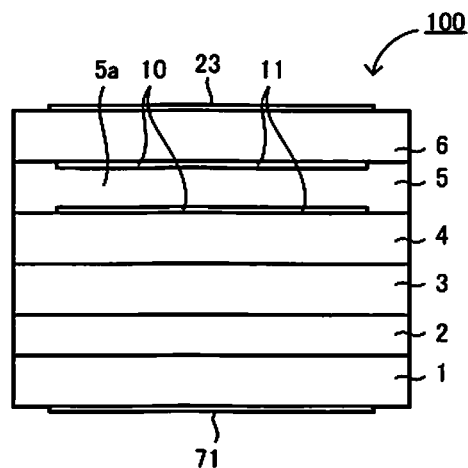
FIG. 2 is a view on arrow A in FIG. 1.
Figure 3:
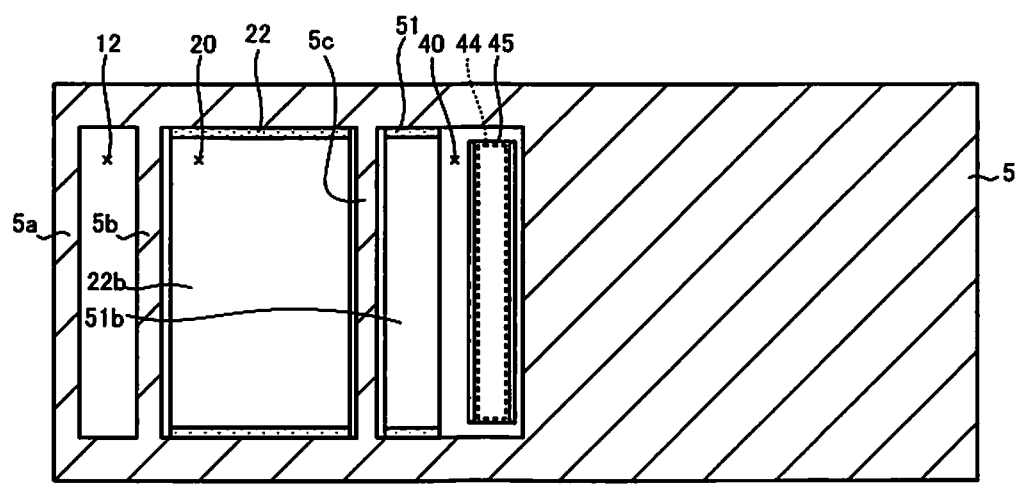
FIG. 3 is a cross-sectional view taken along line B-B in FIG. 1.
Figure 4:
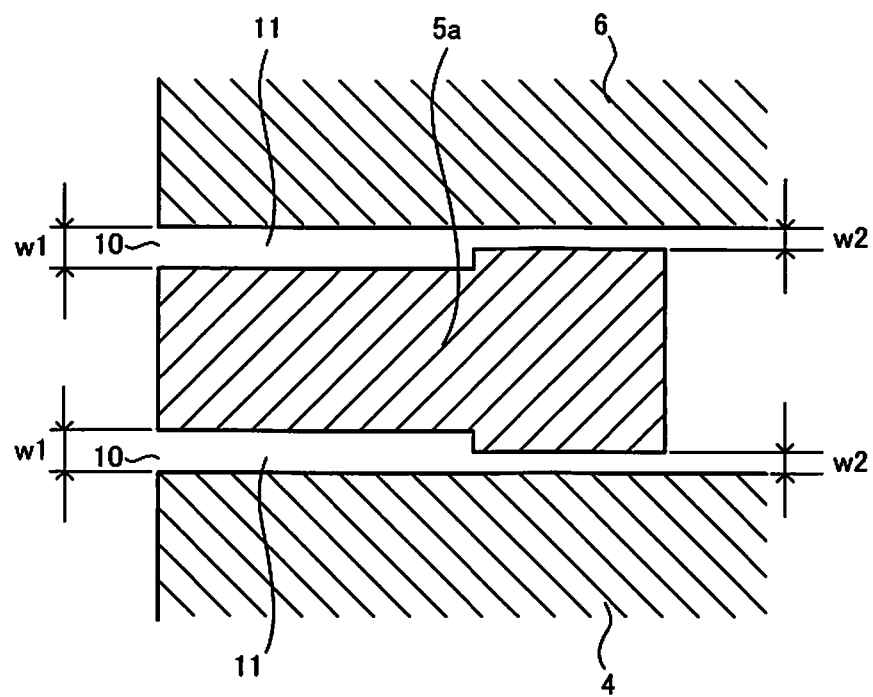
FIG. 4 is an enlarged view of the inside of an ellipse shown by a two-dot chain line in FIG. 1.

Next, an embodiment of the present invention will be described with reference to the drawings. FIG. 1 is a schematic cross-sectional view schematically illustrating an exemplary structure of a gas sensor 100 according to an embodiment of the present invention, FIG. 2 is a view on arrow A in FIG. 1, FIG. 3 is a cross-sectional view taken along line B-B in FIG. 1, and FIG. 4 is an enlarged view illustrating the inside of an ellipse shown by a two-dot chain line in FIG. 1. The gas sensor 100 detects, with a sensor element 101, the concentration of a specific gas component, such as NOx, in a gas to be measured, for example, exhaust gas of an automobile. The sensor element 101 is shaped like a long rectangular parallelepiped. The longitudinal direction of the sensor element 101 (a right-left direction in FIG. 1) is referred to as a front-rear direction, and the thickness direction of the sensor element 101 (an up-down direction in FIG. 1) is referred to as an up-down direction. The width direction of the sensor element 101 (a direction perpendicular to the front-rear direction and the up-down direction) is referred to as a right-left direction.

The sensor element 101 is an element having a structure in which six layers each formed by an oxygen-ion conductive solid electrolyte layer such as a zirconium ($ZrO_2$) layer, namely, a first substrate layer 1, a second substrate layer 2, a third substrate layer 3, a first solid electrolyte layer 4, a spacer layer 5, and a second solid electrolyte layer 6 are stacked in this order from the lower side of the figure. The solid electrolyte that forms these six layers 6 is dense and airtight. For example, such a sensor element 101 is manufactured by subjecting ceramic green sheets corresponding to the layers to predetermined treatment and printing of circuit patterns, then stacking the ceramic green sheets, and further firing and integrating the ceramic green sheets.

In one distal end portion of the sensor element 101 and between a lower surface of the second solid electrolyte layer 6 and an upper surface of the first solid electrolyte layer 4, a gas inlet 10, a first diffusion control part 11, a buffer space 12, a second diffusion control part 13, a first internal space 20, a third diffusion control part 30, and a second internal space 40 are adjacently provided to communicate with one another in this order.

The gas inlet 10, the buffer space 12, the first internal space 20, and the second internal space 40 are spaces formed inside the sensor element 101 by hollowing out the spacer layer 5 in such a manner that their upper portions are defined by the lower surface of the second solid electrolyte layer 6, their lower portions are defined by the upper surface of the first solid electrolyte layer 4, and their side portions are defined by side surfaces of the spacer layer 5.

Each of the first diffusion control part 11, the second diffusion control part 13, and the third diffusion control part 30 is provided as two horizontally long slits (whose openings extend long in a direction perpendicular to the plane of the drawing sheet). FIG. 2 illustrates the shape of the slits in the first diffusion control part 11. A part extending from the gas inlet 10 to the second internal space 40 is also referred to as a gas flowing part.

At a position farther from the distal end portion than the gas flowing part, a reference-gas introduction space 43 is provided between an upper surface of the third substrate layer 3 and a lower surface of the spacer layer 5 and at such a position that side portions thereof are defined by side surfaces of the first solid electrolyte layer 4. As the reference gas for measuring the NOx concentration, for example, air is introduced into the reference-gas introduction space 43.

An air introduction layer 48 is a layer formed of porous alumina. The reference gas is introduced into the air introduction layer 48 through the reference-gas introduction space 43. Also, the air introduction layer 48 covers a reference electrode 42.

The reference electrode 42 is an electrode interposed between the upper surface of the third substrate layer 3 and the first solid electrolyte layer 4. As described above, the air introduction layer 48 communicating with the reference-gas introduction space 43 is provided around the reference electrode 42. As will be described later, the oxygen concentration (oxygen partial pressure) inside the first internal space 20 and the second internal space 40 can be measured by using the reference electrode 42.

In the gas flowing part, the gas inlet 10 is a part opening to an external space. The gas to be measured is taken from the external space into the sensor element 101 through the gas inlet 10.

Figure 5:
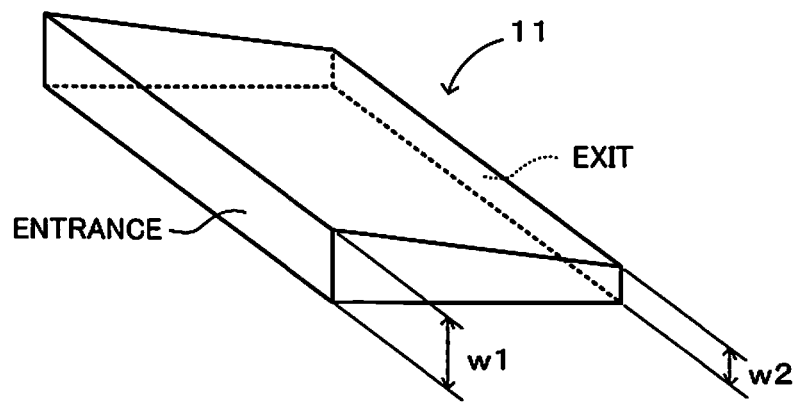
FIG. 5 is a schematic view of an example of a first diffusion control part 11.
Figure 6:
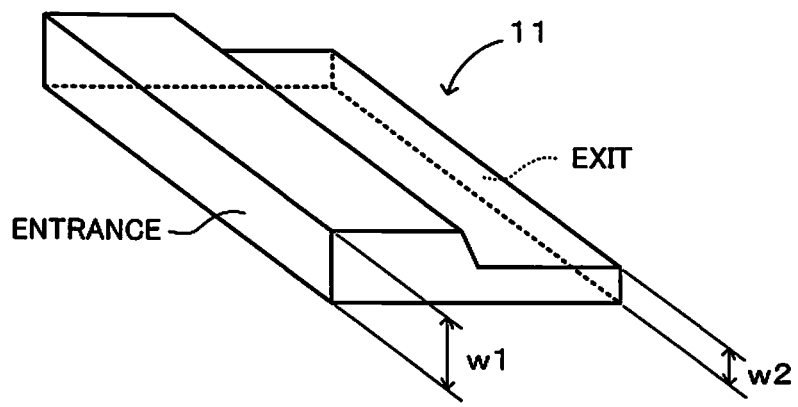
FIG. 6 is a schematic view of an example of the first diffusion control part 11.
Figure 7:
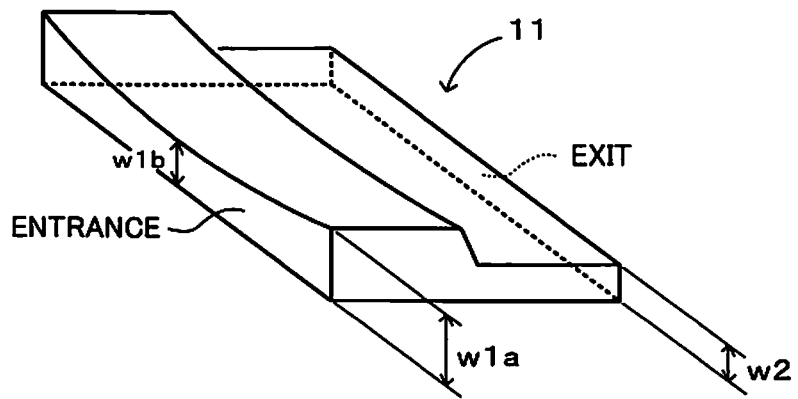
FIG. 7 is a schematic view of an example of the first diffusion control part 11.

The first diffusion control part 11 is a part that applies a predetermined diffusion resistance to the gas to be measured taken in from the gas inlet 10, and is slits provided at an entrance of an internal space of the sensor element 101, that is, on the side of the gas inlet 10. The first diffusion control part 11 is provided between an upper surface of a first bridge portion 5a for bridging the hollow space in the spacer layer 5 and the lower surface of the second solid electrolyte layer 6 and between a lower surface of the first bridge portion 5a and the upper surface of the first solid electrolyte layer 4. As illustrated in FIG. 4, a slit width w1 of the first diffusion control part 11 on the side of the gas inlet 10 is larger than a slit width w2 of the first diffusion control part 11 on the side of the buffer space 12 (w1>w2). The slit widths w1 and w2 may be appropriately set in consideration of, for example, the size of an aggregation substance of particulate matter (PM) discharged from a diesel engine. FIGS. 5 to 7 are schematic views of the first diffusion control part 11. As illustrated in FIG. 6, both the entrance and the exit of the first diffusion control part 11 may be rectangular, and the slit width may decrease at a stepped portion as the boundary between the entrance and the exit. As illustrated in FIG. 5, both the entrance (gas inlet 10) and the exit of the first diffusion control part 11 may be rectangular, and the slit width may gradually decrease from the entrance toward the exit. Alternatively, as illustrated in FIG. 7, a slit width w1a of end portions may be larger than a slit width w1b of a center portion at the entrance of the first diffusion control part 11, and at least the slit width w1a of the end portions may be larger than a slit width w2 at the exit. In this case, the slit width w1a is set at such a size that allows solids to pass therethrough. For example, the slit widths w1 and w1a may be set at 10 μm or more.

The buffer space 12 is a space provided to guide the gas to be measured introduced from the first diffusion control part 11 to the second diffusion control part 13.

The second diffusion control part 13 is a part that applies a predetermined diffusion resistance to the gas to be measured introduced from the buffer space 12 into the first internal space 20. The second diffusion control part 13 is provided between an upper surface of a second bridge portion 5b bridging the hollow space in the spacer layer 5 and the lower surface of the second solid electrolyte layer 6 and between a lower surface of the second bridge portion 5b and the upper surface of the first solid electrolyte layer 4.

When the gas to be measured is introduced from the outside of the sensor element 101 into the first internal space 20, it is rapidly introduced from the gas inlet 10 into the sensor element 101 by a pressure change of the gas to be measured in the external space (a pulsation of exhaust gas pressure in the case where the gas to be measured is an automobile exhaust gas). The gas to be measured is not directly introduced into the first internal space 20, but is introduced into the first internal space 20 after a concentration change in the gas to be measured is cancelled through the first diffusion control part 11, the buffer space 12, and the second diffusion control part 13. Thus, the concentration change of the gas to be measured introduced in the first internal space 20 becomes substantially negligibly small.

The first internal space 20 is provided as a space that adjusts the oxygen partial pressure in the gas to be measured introduced through the second diffusion control part 13. Such oxygen partial pressure is adjusted by the operation of a main pump cell 21.

The main pump cell 21 is an electrochemical pump cell constituted by an inner pump electrode 22 having a ceiling electrode portion 22a provided on the substantially entire lower surface of the second solid electrolyte layer 6 facing the first internal space 20, an outer pump electrode 23 provided in a region of the upper surface of the second solid electrolyte layer 6 corresponding to the ceiling electrode portion 22a to be exposed to the external space, and the second solid electrolyte layer 6 interposed between these electrodes.

The inner pump electrode 22 is provided over the upper and lower solid electrolyte layers (second solid electrolyte layer 6 and first solid electrolyte layer 4) that define the first internal space 20 and the spacer layer 5 that provides side walls. Specifically, a ceiling electrode portion 22a is provided on the lower surface of the second solid electrolyte layer 6 that provides a ceiling surface of the first internal space 20, a bottom electrode portion 22b is provided on the upper surface of the first solid electrolyte layer 4 that provides a bottom surface, and side electrode portions (not illustrated) are provided on side wall surfaces (inner surfaces) of the spacer layer 5 that form both side wall portions of the first internal space 20 so as to connect the ceiling electrode portion 22a and the bottom electrode portion 22b. Thus, the inner pump electrode 22 has a tunnel shape at a portion where the side electrode portions are disposed.

The inner pump electrode 22 and the outer pump electrode 23 are each provided as a porous cermet electrode (for example, a cermet electrode composed of Pt containing Au by 1% and $ZrO_2$). The inner pump electrode 22 to be in contact with the gas to be measured is formed of a material having a weakened reduction ability with respect to a NOx component in the gas to be measured.

In the main pump cell 21, oxygen in the first internal space 20 can be pumped out into the external space or oxygen in the external space can be pumped into the first internal space 20 by applying a desired pump voltage Vp0 between the inner pump electrode 22 and the outer pump electrode 23 and passing a pump current Ip0 in the positive direction or the negative direction between the inner pump electrode 22 and the outer pump electrode 23.

To detect the oxygen concentration (oxygen partial pressure) in the atmosphere of the first internal space 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main-pump-controlling oxygen-partial-pressure detection sensor cell 80.

By measuring an electromotive force V0 in the main-pump-controlling oxygen-partial-pressure detection sensor cell 80, the oxygen concentration (oxygen partial pressure) inside the first internal space 20 is found. Further, the pump current Ip0 is controlled by feedback-controlling the pump voltage Vp0 of a variable power supply 24 so that the electromotive force V0 is constant. This can keep the oxygen concentration in the first internal space 20 at a predetermined constant value. The slit widths w1 and w2 of the first diffusion control part 11 are set so that the pump current Ip0 does not exceed a predetermined upper limit current (for example, 3 mA or 4 mA).

The third diffusion control part 30 is a part that applies a predetermined diffusion resistance to the gas to be measured whose oxygen concentration (oxygen partial pressure) is controlled by the operation of the main pump cell 21 in the first internal space 20 and guides the gas to be measured to the second internal space 40. This third diffusion control part 30 is provided between an upper surface of a third bridge portion 5c bridging the hollow space in the spacer layer 5 and the lower surface of the second solid electrolyte layer 6 and between a lower surface of the third bridge portion 5c and the upper surface of the first solid electrolyte layer 4.

The second internal space 40 is provided as a space for performing treatment relating to measurement of the concentration of nitrogen oxide moo in the gas to be measured introduced through the third diffusion control part 30. The NOx concentration is mainly measured in the second internal space 40 whose oxygen concentration is adjusted by an auxiliary pump cell 50, and further, the NOx concentration is measured by the operation of a measurement pump cell 41.

In the second internal space 40, after the oxygen concentration (oxygen partial pressure) is adjusted beforehand in the first internal space 20, the oxygen partial pressure of the gas to be measured introduced through the third diffusion control part 30 is further adjusted by the auxiliary pump cell 50. Thus, the oxygen concentration in the second internal space 40 can be accurately kept constant. Hence, this gas sensor 100 can perform highly accurate measurement of the NOx concentration.

The auxiliary pump cell 50 is an auxiliary electrochemical pump cell constituted by an auxiliary pump electrode 51 having a ceiling electrode portion 51a provided on a substantially entire lower surface of the second solid electrolyte layer 6 facing the second internal space 40, the outer pump electrode 23 (not limited to the outer pump electrode 23, but may be an appropriate electrode provided outside the sensor element 101), and the second solid electrolyte layer 6.

Such an auxiliary pump electrode 51 has a structure of a tunnel shape similar to that of the inner pump electrode 22 provided in the first internal space 20, and is disposed inside the second internal space 40. That is, the auxiliary pump electrode 51 has a structure of such a tunnel shape that the ceiling electrode portion 51a is provided on the second solid electrolyte layer 6 providing a ceiling surface to the second internal space 40, a bottom electrode portion 51b is provided on the first solid electrolyte layer 4 providing a bottom surface to the second internal space 40, and side electrode portions (not illustrated) which connect the ceiling electrode portion 51a and the bottom electrode portion 51b are provided on both wall surfaces of the spacer layer 5 providing side walls to the second internal space 40.

Similarly to the inner pump electrode 22, the auxiliary pump electrode 51 is also formed of a material having a weakened reduction ability with respect to the NOx component in the gas to be measured.

In the auxiliary pump cell 50, a desired voltage Vp1 is applied between the auxiliary pump electrode 51 and the outer pump electrode 23. This allows oxygen in the atmosphere of the second internal space 40 to be pumped out to the external space or oxygen in the external space to be pumped into the second internal space 40.

To control the oxygen partial pressure in the atmosphere of the second internal space 40, an electrochemical sensor cell, that is, an auxiliary-pump-controlling oxygen-partial-pressure detection sensor cell 81 is constituted by the auxiliary pump electrode 51, the reference electrode 42, the second solid electrolyte layer 6, the spacer layer 5, the first solid electrolyte layer 4, and the third substrate layer 3.

A variable power supply 52 that is voltage-controlled on the basis of an electromotive force V1 detected by the auxiliary-pump-controlling oxygen-partial-pressure detection sensor cell 81 causes the auxiliary pump cell 50 to perform pumping. Thus, the oxygen partial pressure in the atmosphere of the second internal space 40 is controlled to become a low partial pressure that does substantially not influence the NOx measurement.

At the same time, a pump current Ip1 of the auxiliary pump cell 50 is used to control the electromotive force of the main-pump-controlling oxygen-partial-pressure detection sensor cell 80. Specifically, the pump current Ip1 is input as a control signal to the main-pump-controlling oxygen-partial-pressure detection sensor cell 80, and its electromotive force V0 is controlled so that a gradient of the oxygen partial pressure in the gas to be measured introduced from the third diffusion control part 30 into the second internal space 40 is always kept constant. When used as a NOx sensor, the oxygen concentration in the second internal space 40 is kept at a constant value of about 0.001 ppm by the operations of the main pump cell 21 and the auxiliary pump cell 50.

The measurement pump cell 41 measures the NOx concentration in the gas to be measured inside the second internal space 40. The measurement pump cell 41 is an electrochemical pump cell constituted by a measurement electrode 44 provided on the upper surface of the first solid electrolyte layer 4 facing the second internal space 40 and at a position spaced away from the third diffusion control part 30, the outer pump electrode 23, the second solid electrolyte layer 6, the spacer layer 5, and the first solid electrolyte layer 4.

The measurement electrode 44 is a porous cermet electrode. The measurement electrode 44 also functions as a NOx reducing catalyst that reduces NOx existing in the atmosphere of the second internal space 40. Further, the measurement electrode 44 is covered with a fourth diffusion control part 45.

The fourth diffusion control part 45 is a film formed of a porous material containing alumina ($Al_2O_3$) as a main component. The fourth diffusion control part 45 serves to limit the amount of NOx flowing into the measurement electrode 44, and also functions as a protective film for the measurement electrode 44. The measurement pump cell 41 can pump out oxygen generated by decomposition of nitrogen oxide in the atmosphere around the measurement electrode 44, and can detect the amount of the generated oxygen as a pump current Ip2.

To detect the oxygen partial pressure around the measurement electrode 44, an electrochemical sensor cell, that is, a measurement-pump-controlling oxygen-partial-pressure detection sensor cell 82 is constituted by the first solid electrolyte layer 4, the third substrate layer 3, the measurement electrode 44, and the reference electrode 42. A variable power supply 46 is controlled on the basis of an electromotive force V2 detected by the measurement-pump-controlling oxygen-partial-pressure detection sensor cell 82.

The gas to be measured guided into the second internal space 40 reaches the measurement electrode 44 through the fourth diffusion control part 45 under the condition where the oxygen partial pressure thereof is controlled. Nitrogen oxide in the gas to be measured around the measurement electrode 44 is reduced ($2NO \rightarrow N_2 + O_2$) to generate oxygen. The generated oxygen is pumped by the measurement pump cell 41. At this time, a voltage Vp2 of the variable power supply 46 is controlled so that a control voltage V2 detected by the measurement-pump-controlling oxygen-partial-pressure detection sensor cell 82 is constant. The amount of oxygen generated around the measurement electrode 44 is proportional to the concentration of nitrogen oxide in the gas to be measured. Hence, the nitrogen-oxide concentration in the gas to be measured is calculated by using a pump current Ip2 of the measurement pump cell 41.

When the measurement electrode 44, the first solid electrolyte layer 4, the third substrate layer 3, and the reference electrode 42 are combined to constitute an oxygen-partial-pressure detection device serving as an electrochemical sensor cell, an electromotive force in accordance with the difference between the amount of oxygen generated by reduction of the NOx component in the atmosphere around the measurement electrode 44 and the amount of oxygen contained in a reference atmosphere can be detected. This allows the concentration of the NOx component in the gas to be measured to be found.

An electrochemical sensor cell 83 is constituted by the second solid electrolyte layer 6, the spacer layer 5, the first solid electrolyte layer 4, the third substrate layer 3, the outer pump electrode 23, and the reference electrode 42. By an electromotive force Vref obtained by the sensor cell 83, the oxygen partial pressure in the gas to be measured outside the sensor can be detected.

In the gas sensor 100 having such a structure, by operating the main pump cell 21 and the auxiliary pump cell 50, the gas to be measured whose oxygen partial pressure is always kept at a constant low value (value having substantially no influence on measurement of NOx) is given to the measurement rump cell 41. Therefore, the NOx concentration in the gas to be measured can be recognized on the basis of the pump current Ip2 that flows owing to the oxygen generated by reduction of NOx being pumped out by the measurement pump cell 41 substantially in proportion to the NOx concentration in the gas to be measured.

To enhance the oxygen-ion conductivity of the solid electrolyte, the sensor element 101 further includes a heater unit 70 serving for temperature control to keep the sensor element 101 warm by heating. The heater unit 70 includes a heater electrode 71, a heater 72, a through hole 73, a heater insulating layer 74, and a pressure release hole 75.

The heater electrode 71 is an electrode provided in contact with a lower surface of the first substrate layer 1. By connecting the heater electrode 71 to an external power supply, electrical power can be supplied from the outside to the heater unit 70.

The heater 72 is an electric resistor held between the second substrate layer 2 and the third substrate layer 3 from the upper and lower sides. The heater 72 is connected to the heater electrode 71 through the through hole 73. The heater 72 generates heat when power is supplied thereto from the outside through the heater electrode 71, and heats and keeps warm the solid electrolyte that forms the sensor element 101.

The heater 72 is buried in the entire area extending from the first internal space 20 to the second internal space 40, and can adjust the temperature of the entire sensor element 101 to a temperature at which the solid electrolyte is activated.

The heater insulating layer 74 is an insulating layer formed by an insulator, such as alumina, on upper and lower surfaces of the heater 72. The heater insulating layer 74 is provided to obtain electrical insulation between the second substrate layer 2 and the heater 72 and electrical insulation between the third substrate layer 3 and the heater 72.

The pressure release hole 75 is a part that penetrates the third substrate layer 3 and communicates with the reference-gas introduction space 43, and is aimed to relieve a rise in internal pressure resulting from a temperature rise in the heater insulating layer 74.

Although not illustrated in FIG. 1, the electrodes, namely, the outer pump electrode 23, the inner pump electrode 22, the auxiliary pump electrode 51, the measurement electrode 44, and the reference electrode 42 are conductively connected on a one-to-one basis to a plurality of electrode lead wires extending toward a rear end of the sensor element 101 (right end in FIG. 1). Through these electrode lead wires, the voltage or current can be applied to the electrodes, and the voltages or currents of the electrodes can be measured.

Next, an example of a manufacturing method for this gas sensor 100 will be described below. First, six unfired ceramic green sheets each containing, as a ceramic component, an oxygen-ion conductive solid electrolyte, such as zirconia, are prepared. In these green sheets, for example, a plurality of sheet holes used for positioning during printing and lamination and a plurality of necessary through holes are formed beforehand. In the green sheet to become a spacer layer 5, a space serving as a gas-to-be-measured flowing part is formed beforehand, for example, by punching. In the green sheet to become a first solid electrolyte layer 4, a space serving as a reference-gas introduction space 43 is similarly formed. Then, the ceramic green sheets are subjected to pattern printing forming various patterns and drying, in correspondence to a first substrate layer 1, a second substrate layer 2, a third substrate layer 3, a first solid electrolyte layer 4, a spacer layer 5, and a second solid electrolyte layer 6. Specifically, the patterns to be formed are, for example, patterns of the above-described electrodes, lead wires connected to the electrodes, an air introduction layer 48, and a heater unit 70. Pattern printing is performed by applying pattern forming paste, which is prepared according to the required characteristics of the object to be formed, onto the green sheets by using a known screen print technique. Drying is also performed by using a known drying device. When pattern printing and drying are finished, an adhesive paste is printed and dried to stack and bond the green sheets corresponding to the layers. Then, the green sheets an which the adhesive paste has been applied are stacked in a predetermined order while being aligned by using the sheet holes, and are subjected to pressure bonding to be pressure-bonded into a single laminated body by adding predetermined temperature and pressure conditions. The laminated body thus obtained includes a plurality of sensor elements 101. The laminated body is cut to a size of each sensor element 101. By firing the cut laminated body at a predetermined firing temperature, a sensor element 101 is obtained. When the sensor element 101 is thus obtained, it is stored in a predetermined housing and assembled into a main body (not illustrated) of a gas sensor 100. Thus, the gas sensor 100 is obtained.

Figure 8A:
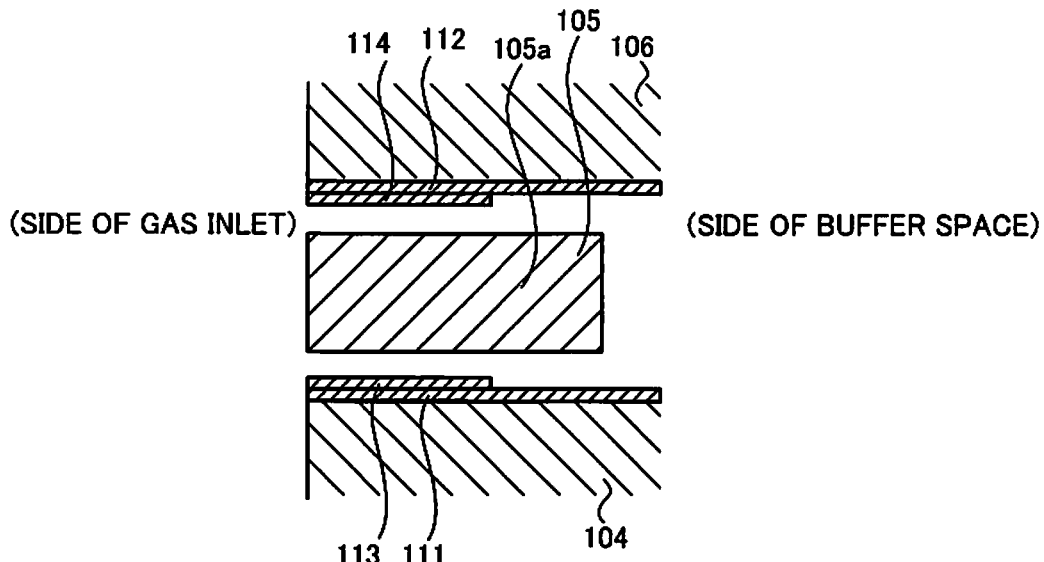
FIGS. 8A to 8C include partial cross-sectional views illustrating a formation process of the first diffusion control part 11 in a sensor element 101.
Figure 8B:
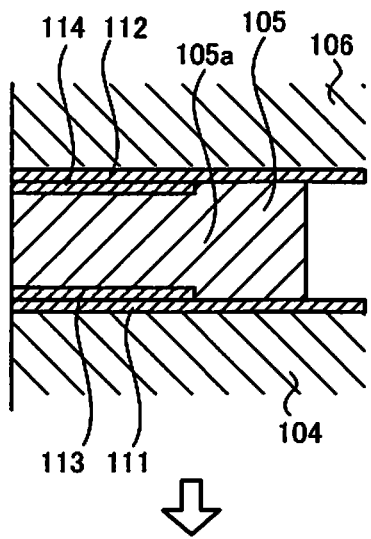
Figure 8C:
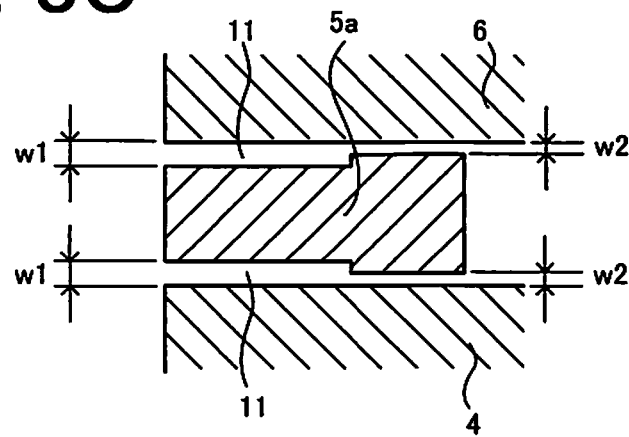

A method for forming the first diffusion control part 11 will now be described. FIGS. 8A to 8C include partial cross-sectional views illustrating a formation process for the first diffusion control part 11. First, as illustrated in FIG. 8A, in the above-described pattern printing process, a first disappearing material layer 111 is printed to cover a region on an upper surface of a green sheet 104, which is to become a first solid electrolyte layer 4, opposed to a portion 105a corresponding to a first bridge portion 5a of a green sheet 105, which is to become a spacer layer 5. The first disappearing material layer 111 is printed from the gas inlet 10 to be longer than the depth (length in the right-left direction in FIGS. 8A to 8C) of the portion 105a corresponding to the first bridge portion 5a. The first disappearing material layer 111 is a layer formed of a material that disappears when burned at a predetermined firing temperature (for example, theobromine). Next, a second disappearing material layer 113 having a predetermined length from the gas inlet 10 is printed on a surface of the first disappearing material layer 111. The second disappearing material layer 113 is formed of the same material as that of the first disappearing material layer 111. The length of the second disappearing material layer 113 is shorter than the length of the portion 105a corresponding to the first bridge portion 5a, and for example, may be about a half (40% to 60%) of the length of the portion 105a. On the other hand, similarly, a first disappearing material layer 112 and a second disappearing material layer 114 are printed on a region of a lower surface of a green sheet 106, which is to become a second solid electrolyte layer 6, opposed to the portion 105a corresponding to the first bridge portion 5a. After that, the above-described drying process is performed.

Subsequently, as illustrated in FIG. 8B, the six green sheets including these green sheets 104 to 106 are subjected to the above-described pressure bonding to form a laminated body. In the obtained laminated body, at least one of the upper surface of the green sheet 104 and the lower surface of the portion 105a corresponding to the first bridge portion 5a is dented along the shapes of the first and second disappearing material layers 111 and 113 because it is softer than the first and second disappearing material layers 111 and 113. Also, at least one of the lower surface of the green sheet 106 and the upper surface of the portion 105a corresponding to the first bridge portion 5a is dented along the shapes of the first and second disappearing material layers 112 and 114 because it is softer than the first and second disappearing material layers 112 and 114. The two first disappearing material layers 111 and 112 may be formed with the same thickness or may be formed with different thicknesses. The two second disappearing material layers 113 and 114 may also be formed with the same thickness or may be formed with different thicknesses.

After that, the laminated body is cut to the size of each sensor element 101, and the cut laminated body is fired at the predetermined firing temperature. Then, as illustrated in FIG. 8C, the first and second disappearing material layers 111 to 114 burn and disappear to form a first diffusion control part 11. The green sheets 104 and 106 and the portion 105a corresponding to the first bridge portion 5a are fired to become first and second solid electrolyte layers 4 and 6 and a first bridge portion 5a. A slit width w1 of the first diffusion control part 11 on the side of the gas inlet 10 becomes a value based on the sum of the thickness of the first disappearing material layer 111 and the thickness of the second disappearing material layer 113 and the sum of the thickness of the first disappearing material layer 112 and the thickness of the second disappearing material layer 114. A slit width w2 on the side of the buffer space 12 becomes a value based on the thickness of the first disappearing material layer 111 and the thickness of the first disappearing material layer 112. For this reason, the slit widths w1 and w2 of the first diffusion control part 11 can be controlled by the thicknesses of the first and second disappearing material layers 111 to 114. Although a stepped portion sometimes remains, as illustrated in FIG. 8C, when the first diffusion control part 11 is viewed from the depth direction (left-right direction in FIGS. 8A to 8C), the stepped portion is sometimes turned into an inclined surface during pressure bonding or during firing. While the second and third diffusion control parts 13 and 30 can be formed in conformity to the first diffusion control part 11, only the first disappearing material layer is printed, but the second disappearing material layer is not printed.

Here, the correspondences between the constituent elements of the embodiment and the constituent elements of the present invention will be clarified. The first diffusion control part 11 in this embodiment corresponds to the slit (width transition slit) that constitutes the sensor element of the present invention, the inner pump electrode 22 corresponds to the inner pump electrode, the outer pump electrode 23 corresponds to the outer pump electrode and the outer measurement electrode, the measurement electrode 44 corresponds to the inner measurement electrode, the heater 72 corresponds to the heater, the space from the gas inlet 10 to the second internal space 40 corresponds to the internal space, and the gas inlet 10 corresponds to the entrance of the internal space. On the other hand, the step of preparing six unfired ceramic green sheets in this embodiment corresponds to the step (a) of the manufacturing method of the present invention, the step of performing pattern printing and drying corresponds to the step (b), and the step of pressure-bonding the green sheets into the single laminated body, cutting the laminated body to the size of each sensor element 101, and firing the cut laminated body corresponds to the step (c). Further, the first and second disappearing material layers 111 to 114 correspond to the disappearing material layer, and the portion 105a of the green sheet 105 to become the spacer layer 5 corresponds to the slit forming portion.

In the above-described sensor element 101 of this embodiment, oxygen contained in the gas to be measured introduced from the external space into the first internal space 20 through the gas inlet 10 and the first diffusion control part 11 is pumped out to the external space by applying the voltage between the inner pump electrode 22 and the outer pump electrode 23. Also, oxygen contained in the gas to be measured introduced into the second internal space 40 is pumped out to the external space by applying the voltage between the auxiliary pump electrode 51 and the outer pump electrode 23. This can make the concentration of oxygen contained in the gas to be measured close to zero. After the oxygen is pumped out to the external space, NOx in the gas to be measured generates oxygen by being reduced by the measurement electrode 44. This oxygen is pumped by applying the voltage between the measurement electrode 44 and the outer pump electrode 23. On the basis of the current or voltage generated according to the amount of oxygen thus pumped, the NOx gas concentration is calculated. Here, the slit width w1 of the first diffusion control part 11 on the side of the gas inlet 10 is larger than the slit width w2 on the side of the buffer space 12. For this reason, most solids, such as soot, contained in the gas to be measured do not adhere near the entrance of the first diffusion control part 11 having a large slit width, but enter the first diffusion control part 11 and adhere to the portion having a small slit width. Since the temperature inside the first diffusion control part 11 is increased to a high temperature (for example, 600° C. or more) by being heated by the heater 72, the solids adhering inside the first diffusion control part 11 burn and disappear. As a result, the amount of gas to be measured introduced into the first diffusion control part 11 is not limited by the adhering solids. Therefore, the detected value of the NOx gas concentration can be prevented from being made inaccurate by the solids contained in the gas to be measured.

Soot does not adhere near the entrance of the slit as long as the slit width in the entire first diffusion control part 11 is set such as to permit passage of the soot. In this case, however, the introduction amount of gas to be measured becomes too large, and the concentration of oxygen contained in the gas to be measured inside the second internal space 40 cannot be made close to zero. This may hinder accurate calculation of the NOx gas concentration.

The slit width w1 of the first diffusion control part 11 on the side of the gas inlet 10 may be 10 to 20 µm, and the slit width w2 on the side of the buffer space 12 may be smaller than the slit width w1, that is, may be 2 to 10 µm. In this case, solids, such as soot, contained in the gas to be measured and having a size of about several micrometres to 10 micrometres do not adhere near the entrance, but easily enter the first diffusion control part 11 and easily adhere to the portion having the small slit width inside the first diffusion control part 11.

Further, in the above-described manufacturing method for the sensor element 101, the portion remaining after the first and second disappearing material layers 111 to 114 burn and disappear becomes the first diffusion control part 11. Since the first and second disappearing material layers 111 to 114 are formed so that their thicknesses increase toward the gas inlet 10, the first diffusion control part 11 takes their shapes over, and the slit width w1 on the side of the gas inlet 10 is larger than the slit width w2 an the side of the buffer space 12. Therefore, the above-described sensor element 101 can be manufactured easily. Further, the portion of the green sheet 105, which corresponds to the first bridge portion 5a, on the side of the gas inlet 10 is less sufficiently supported than the portion on the side of the buffer space 12, and therefore, is apt to hang down during firing. However, since the slit width w1 of the first diffusion control part 11 on the side of the gas inlet 10 is large, even if the portion 105a hangs down, it can be prevented from closing the slit of the first diffusion control part 11.

Still further, after the first disappearing material layers 111 and 112 having the length more than or equal to the length of the first bridge portion 5a in the depth direction are formed from the gas inlet 10, the second disappearing material layers 113 and 114 having the length less than the length of the first bridge portion 5a in the depth direction are formed from the gas inlet 10 on the surfaces of the first disappearing material layers 111 and 112. These first and second disappearing material layers 111 to 114 can be easily formed, for example, by printing.

It is needless to say that the present invention is not limited to the above-described embodiment, and can be carried out by various modes within the technical scope of the invention.

For example, while the first disappearing material layers 111 and 112 and the second disappearing material layers 113 and 114 are formed when forming the first diffusion control part 11 in the above-described embodiment, formation of the second disappearing material layers 113 and 114 may be omitted, and the first disappearing material layers 111 and 112 may be formed so that their thicknesses gradually increase from the side of the buffer space 12 toward the side of the gas inlet 10.

While theobromine is given as an example of the material of the first and second disappearing material layers 111 to 114 in the above-described embodiment, the material is not particularly limited thereto, and it is only necessary that the material should burn and disappear during firing. For example, organic synthetic resin, such as nylon, phenolic resin, acrylic resin, polyethylene, polyethyleneterephthalate, and foaming resin, may be used, or a carbon material, such as graphite, may be used.

While the first and second disappearing material layers 111 and 113 are formed on the green sheet 104 and the first and second disappearing material layers 112 and 114 are formed on the green sheet 106 in the above-described embodiment, the first disappearing material layer 111 may be formed on the green sheet 104, the second disappearing material layer 113 may be formed on the portion 105a corresponding to the first bridge portion 5a, the first disappearing material layer 112 may be formed on the green sheet 106, and the second disappearing material layer 114 may be formed on the portion 105a.

Figure 9:
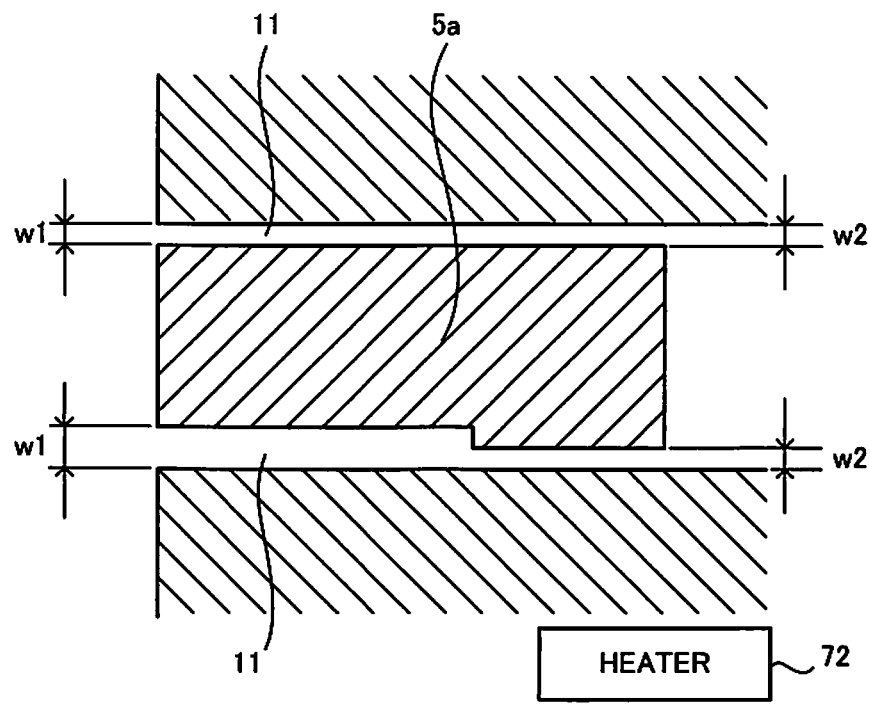
FIG. 9 is a schematic cross-sectional view of a modification of the first diffusion control part 11.
Figure 10:
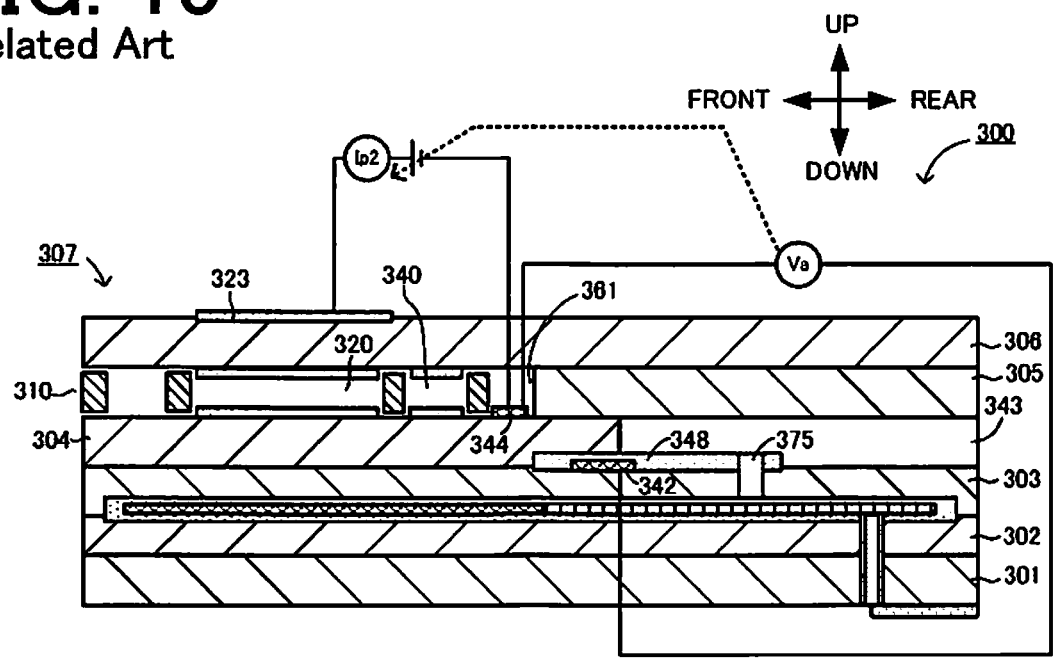
FIG. 10 is a schematic cross-sectional view of a gas sensor 300 of the conventional art.

While the first diffusion control part 11 on both upper and lower sides of the first bridge portion 5a is formed so that the slit width w1 on the side of the gas inlet 10 is larger than the slit width w2 on the side of the buffer space 12 (w1>w2) in the above-described embodiment, the portion of the first diffusion control part 11 on only one of the upper and lower sides may be formed as in the above-described embodiment. In this case, as illustrated in FIG. 9, the portion of the first diffusion control part 11 on the side close to the heater 72 (lower side of the first bridge portion 5a) is preferably formed as in the above-described embodiment. Thus, solids entering the first diffusion control part 11 on the lower side of the first bridge portion 5a are easily heated to a high temperature by the heater 72. Hence, the solids easily burn and disappear. The portion of the first diffusion control part 11 on the side far from the heater 72 (upper side of the first bridge portion 5*a*) may be formed so that the slit width w1 is substantially equal to the slit width w2.

The present application claims priority from Japanese Patent Application No. 2016-061366 filed on Mar. 25, 2016, the entire contents of which are incorporated herein by reference.

What is claimed is:

1. A sensor element including:
   one or more slits provided on an entrance side of an internal space in a base formed of a plurality of stacked oxygen-ion conductive solid electrolyte layers and a spacer layer between two of the plurality of oxygen-ion conductive solid electrolyte layers, an entirety of each of the one or more slits being formed directly between one of the plurality of oxygen-ion conductive solid electrolyte layers and a portion of the spacer layer in a stacking direction of the plurality of oxygen-ion conductive solid electrolyte layers;
   an inner pump electrode and an outer pump electrode respectively disposed inside and outside the base and configured to pump out oxygen contained in a gas to be measured introduced into the internal space from the internal space to an external space;
   an inner measurement electrode disposed inside the base and configured to, along with the outer pump electrode, decompose a predetermined gas component contained in the gas to be measured after the oxygen is pumped out by the inner pump electrode and the outer pump electrode and to pump out oxygen generated by the decomposition to the external space; and
   a heater configured to heat the base,
   wherein at least one of the one or more slits is a width transition slit having a slit width that is larger in the stacking direction of the plurality of oxygen-ion conductive solid electrolyte layers on an entrance side of the slit than on an exit side of the slit.

2. The sensor element according to claim 1,
   wherein the slit width of the width transition slit on the entrance side is larger in an entrance end portion than in an entrance center portion, and the slit width of at least the entrance end portion is larger than the slit width of the width transition slit on the exit side.

3. The sensor element according to claim 1,
   wherein the one or more slits are a plurality of slits.

4. The sensor element according to claim 1,
   wherein the one or more slits are two slits respectively provided on opposite sides of a portion of a layer of the base, the opposite sides including a first side and a second side that is closer to the heater than the first side, and at least the slit on the second side of the portion of the layer of the base is the width transition slit.

5. A method of manufacturing the sensor element of claim 1, comprising:
   (a) a step of preparing a plurality of green sheets each formed of an oxygen-ion conductive solid electrolyte;
   (b) a step of forming precursors of the inner and outer pump electrodes and precursors of the inner measurement electrode on at least one green sheet of the plurality of green sheets and forming disappearing material layers on surfaces of two green sheets facing the internal space to define the internal space, of the plurality of green sheets, the disappearing material layers being formed of a material that burns and disappears during firing, and having a thickness increasing toward an entrance of the internal space; and
   (c) a step of stacking the plurality of green sheets so that a slit forming portion formed of an oxygen-ion conductive solid electrolyte is held between the disappearing material layers and treating the plurality of green sheets at a predetermined firing temperature so that the green sheets and the slit forming portion are fired and the disappearing material layers disappear to form the width transition slit.

6. The method of manufacturing according to claim 5,
   wherein in the step (b), when the disappearing material layers are formed, after a first disappearing material layer having a length longer than or equal to the length of the slit forming portion in a depth direction is formed from the entrance of the internal space, a second disappearing material layer having a length shorter than the length of the slit forming portion in the depth direction is formed from the entrance of the internal space on the first disappearing material layer or the slit forming portion.

7. A gas sensor including the sensor element according to claim 1.

* * * * *